United States Patent
Jeong et al.

(10) Patent No.: US 9,019,735 B2
(45) Date of Patent: Apr. 28, 2015

(54) POWER FACTOR CORRECTION CIRCUIT AND METHOD FOR CONTROLLING POWER FACTOR CORRECTION

(71) Applicant: Samsung Electro-Mechanics Co., Ltd., Suwon (KR)

(72) Inventors: In Wha Jeong, Suwon (KR); Kee Ju Um, Suwon (KR); Bum Seok Suh, Suwon (KR); Kwang Soo Kim, Suwon (KR); Min Gyu Park, Suwon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 142 days.

(21) Appl. No.: 13/762,724

(22) Filed: Feb. 8, 2013

(65) Prior Publication Data
US 2014/0119070 A1 May 1, 2014

(30) Foreign Application Priority Data
Oct. 30, 2012 (KR) .......................... 10-2012-0121505

(51) Int. Cl.
*H02M 7/219* (2006.01)
*H02M 1/42* (2007.01)
(Continued)

(52) U.S. Cl.
CPC .............. *H02M 1/42* (2013.01); *H02M 1/4225* (2013.01); *H02M 3/1584* (2013.01); *H02M 2001/342* (2013.01); *H02M 2003/1586* (2013.01); *Y02B 70/126* (2013.01); *Y02B 70/1491* (2013.01)

(58) Field of Classification Search
CPC ........... H02M 1/12; H02M 1/14; H02M 1/15; H02M 1/32; H02M 1/143; H02M 1/4208; H02M 1/4225; H02M 1/4266; H02M 3/1584; H02M 7/06; H02M 7/068; H02M 7/10
USPC .............. 363/45–48, 77, 82, 90, 125, 126, 89
See application file for complete search history.

(56) References Cited

U.S. PATENT DOCUMENTS 6,075,716 A * 6/2000 He et al. .......................... 363/44
6,169,671 B1 * 1/2001 Mao ................................ 363/53

(Continued)

FOREIGN PATENT DOCUMENTS

JP       2006-187140       7/2006
KR    10-2002-0074245       9/2002

OTHER PUBLICATIONS

Office action dated Feb. 26, 2014 from corresponding Korean Patent Application No. 10-2012-0121505 and its English summary provided by the applicants.

(Continued)

*Primary Examiner* — Matthew Nguyen
*Assistant Examiner* — Kevin H Sprenger
(74) *Attorney, Agent, or Firm* — Ladas & Parry, LLP

(57) ABSTRACT

A power factor correction circuit may include a boost converter circuit in which a plurality of boost circuits including a boost inductor, a rectifying diode, and a boost switch are connected with each other; and a snubber circuit including a snubber inductor and a snubber switch so as to snubber the boost converter circuit. The snubber inductor may be controlled so as to be turned on before the boost inductor is turned on to apply zero voltage to the boost inductor. It is possible to reduce switching loss occurring when the boost switch is turned on and increase efficiency of an AC-DC power supply apparatus.

14 Claims, 11 Drawing Sheets

(51) Int. Cl.
*H02M 3/158* (2006.01)
*H02M 1/34* (2007.01)

(56) References Cited

U.S. PATENT DOCUMENTS 8,614,902 B2 * 12/2013 Pansier et al. .................. 363/89
8,723,487 B2 * 5/2014 Pahlevaninezhad et al. . 323/225
2009/0244944 A1 * 10/2009 Jang et al. ..................... 363/126
2010/0118576 A1 * 5/2010 Osaka ........................... 363/126
2012/0014150 A1 * 1/2012 Domb ............................ 363/89

OTHER PUBLICATIONS

Panda et al, Study of Soft Swithcing Boost Converter Using an Auxiliary Resonant Circuit, National Institute of Technology Rourkela (May 2012).

* cited by examiner (a) EXISTING CONVERTER (a) INTERLEAVED ACTIVE
SNUBBER PFC CONVERTER

FIG.11

|  | EXISTING | INTERLEAVED ACTIVE SNUBBER PFC CONVERTER |
|---|---|---|
| EMI / Noise | NORMAL | REDUCTION(→) |
| Efficiency | NORMAL | LARGE(←) |
| Turn-On Loss | LARGE | SMALL(→) |
| Magnetic Size | NO DIFFERENCE (ADDED SNUBBER INDUCTOR IS COUPLED WITH EXISTING BOOST INDUCTOR AND IS APPLIED) | |

POWER FACTOR CORRECTION CIRCUIT AND METHOD FOR CONTROLLING POWER FACTOR CORRECTION

CROSS REFERENCE TO RELATED APPLICATION

This application claims the benefit of Korean Patent Application No. 10-2012-0121505, filed on Oct. 30, 2012, entitled "Power Factor Correction Circuit and Method for Controlling Power Factor Correction", which is hereby incorporated by reference in its entirety into this application.

BACKGROUND OF THE INVENTION

1. Technical Field

The present invention relates to a power factor correction circuit and a method for controlling power factor correction.

2. Description of the Related Art

Various electronic devices and information communication devices are used to facilitate a human life. Home or industrial devices require an AC-DC power supply apparatus that converts AC voltage into DC voltage. Recently, a necessary medium and large-capacity power supply apparatus is urgently required.

As the capacity of the power supply apparatus is medium and large sized, the power supply apparatus needs to meet very strict power supply criteria. In order to meet these criteria, a power factor correction circuit is essentially required. As a technology that is applied to the power factor correction circuit, an active power factor correction (PFC) technology that uses a power semiconductor device and can be controlled by a control signal has been known.

However, it is difficult for the circuit to which the existing active PFC technology is applied to be used for the medium to large AC-DC power supply apparatus of 1 kw or more due to low efficiency, high internal current, input voltage, ripple, electro magnetic interference (EMI) noise.

SUMMARY OF THE INVENTION

The present invention has been made in an effort to provide an active PFC circuit capable of reducing EMI noise by suppressing a ripple of input and output voltage while using an AC-DC power supply apparatus of medium and large capacity of 1 kw or more Further, the present invention has been made in an effort to provide a circuit for maximizing efficiency of a power factor correction circuit by minimizing switching loss occurring at the time of a turn on of a switch due to an increase in a magnitude of current conducted to a switch in a medium and large-capacity power supply apparatus and a method for controlling power factor correction.

According to a preferred embodiment of the present invention, there is provided a power factor correction circuit, including: a boost converter circuit in which a plurality of boost circuits including a boost inductor, a rectifying diode, and a boost switch are connected with each other; and a snubber circuit including a snubber inductor and a snubber switch so as to snubber the boost converter circuit.

The boost converter circuit may further include a boost capacitor.

The boost inductor may have one terminal receiving current and the other terminal connected to the rectifying diode and the boost switch.

The boost converter circuit may be configured by connecting the plurality of boost circuits in parallel.

The snubber circuit may be connected with the boost switch in parallel.

The snubber switch may be configured of any one of a transistor, a power MOSFET and an IGBT.

The snubber switch may be controlled to be turned on before the boost switch is turned on.

When the boost switch is turned on, the snubber switch may be controlled to substantially apply zero voltage switching.

According to another preferred embodiment of the present invention, there is provided a power factor correction circuit, including: a boost converter circuit in which N boost circuits including a boost inductor, a rectifying diode, and a boost switch are connected with each other; and a snubber circuit including N snubber inductors and N snubber switches so as to snubber the boost converter circuit, wherein N is a natural number of 1 or more.

N boost inductors may each have a phase difference of 360°)/N.

According to another preferred embodiment of the present invention, there is provided a power factor correction circuit, including: a boost converter circuit in which N boost circuits including a boost inductor, a rectifying diode, and a boost switch are connected with each other; and a snubber circuit including N snubber switches and M snubber inductors so as to snubber the boost converter circuit, wherein N and M meet N>M.

According to another preferred embodiment of the present invention, there is provided a power factor correction circuit, including: a boost converter circuit in which N boost circuits including a boost inductor, a rectifying diode, and a boost switch are connected with each other, wherein each boost inductor within the N boost circuits has a phase difference of 360°/N and N is an integer of 2 or more.

According to another preferred embodiment of the present invention, there is provided a power factor correction method, including: performing a control to turn on a first snubber switch before a first boost switch driving a first boost inductor having a first phase is turned on; and performing a control to turn on a second snubber switch before a second boost switch driving a second boost inductor having a second phase is turned on.

The power factor correction circuit method may further include: performing a control to turn on an N-th snubber switch before an N-th boost switch driving an N-th boost inductor having an N-th phase is turned on, wherein N is a natural number of 3 or more.

The first phase and the second phase may have a predetermined phase difference.

The power factor correction method may further include: when the boost switch is turned on, controlling the snubber switch to substantially apply zero voltage switching.

According to another preferred embodiment of the present invention, there is provided with a semiconductor chip including the power factor correction circuit as described above.

BRIEF DESCRIPTION OF THE DRAWINGS

The above and other objects, features and advantages of the present invention will be more clearly understood from the following detailed description taken in conjunction with the accompanying drawings, in which:

FIG. 11 is a table comparing effects between the circuit PFC according to the prior art and the interleave active snubber PFC circuit according to the preferred embodiment of the present invention.

DESCRIPTION OF THE PREFERRED EMBODIMENTS

Figure 1:
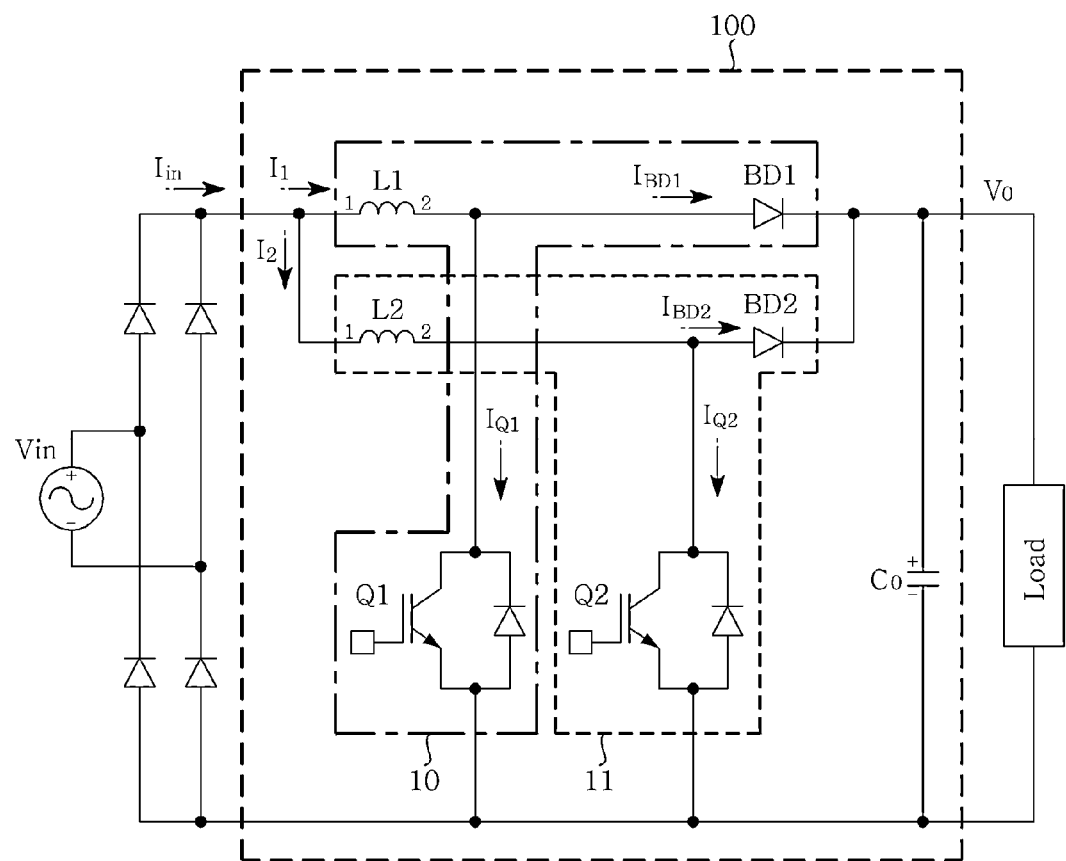
FIG. 1 is a diagram illustrating a two-phase interleave boost power factor correction (PFC) circuit according to a preferred embodiment of the present invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the prior art would obscure the gist of the present invention, the description thereof will be omitted.

Hereinafter, preferred embodiments of the present invention are described in detail with reference to the accompanying drawings.

FIG. 1 is a diagram illustrating a two-phase interleave boost power factor correction (PFC) circuit according to a preferred embodiment of the present invention.

Referring to FIG. 1, an interleave boost PFC circuit 100 includes boost converter circuits 10 and 11 having two different phases and may include a capacitor for accumulating current.

The boost converter circuit 10 includes a boost inductor L1, a rectifying diode BD1, and a boost switch Q1 and current $I_1$ is input from one terminal of the boost inductor L1 and the rectifying diode BD1 and the boost switch Q1 may be directly connected with the other terminal thereof. Similarly, the boost converter circuit 11 includes a boost inductor L2, a rectifying diode BD2, and a boost switch Q2.

Current $I_{in}$ from the AC power supply apparatus is input to the interleave boost PFC circuit 100 via the diode and the two boost converter circuit 10 and boost converter circuit 11 may be connected with each other in parallel. In this case, the input current $I_{in}$ is separately input to each boost converter circuit 10 and 20 ($I_{in}=I_1+I_2$). In addition, when the boost switches Q1 and Q2 are turned on, the occurring current loss may be increased by current flowing in the rectifying diodes BD1 and BD2.

The boost converter circuit 10 and the boost converter circuit 11 may be connected with each other in parallel and may be designed to have a phase difference of 180°. In this case, the current having a phase difference of 180° flows in each boost inductor and therefore, the boost inductor ripple current is offset with each other. As a result, the ripple of the input current may be remarkably reduced. Further, the interleave boost PFC circuit 100 may be operated so that the overall output power is equally shared to each boost converter circuit 10 and 20 connected with each other in parallel for a switching period at a time difference, thereby simultaneously reducing the ripple of the input current and the ripple of the output voltage.

Therefore, it is possible to remarkably reduce a size of a filter for removing electro magnetic interference (EMI) and reduce conduction loss of the PFC circuit.

Figure 2:
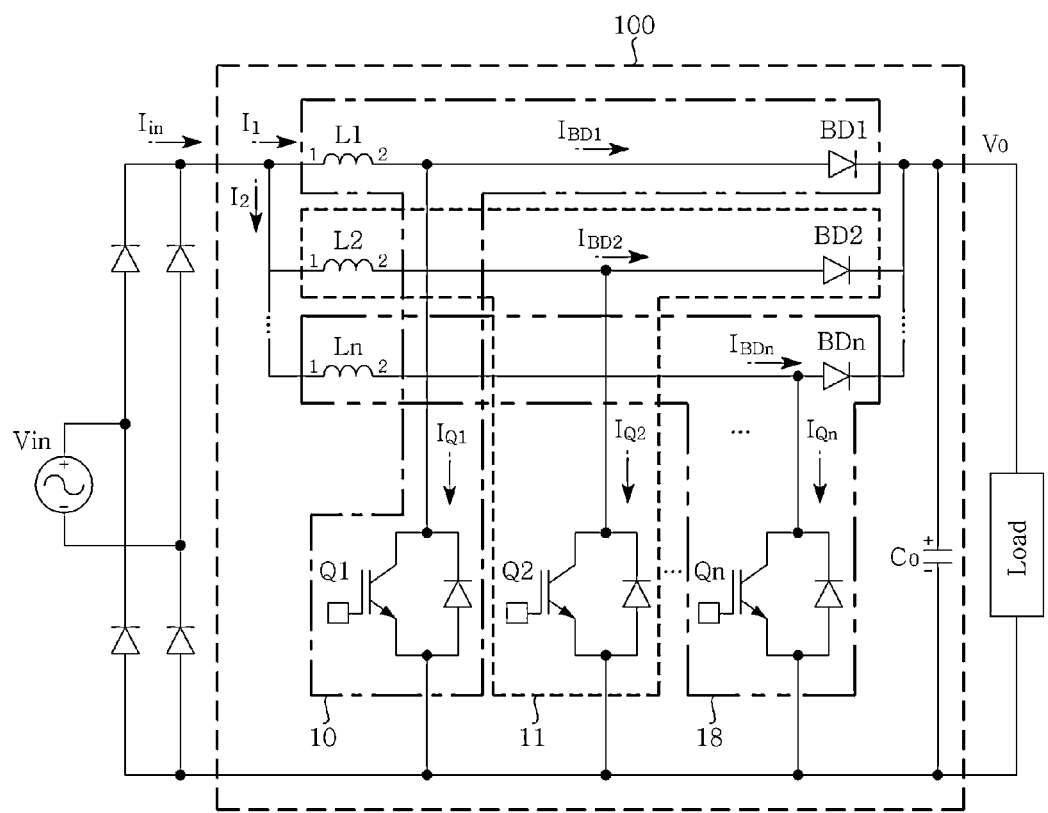
FIG. 2 is a diagram illustrating an N-phase interleave boost PFC circuit according to the preferred embodiment of the present invention.

FIG. 2 is a diagram illustrating an N-phase interleave boost PFC circuit according to the preferred embodiment of the present invention.

The N-phase interleave boost PFC circuit of FIG. 2 illustrates that the present invention may be extended from the two-phase interleave boost PFC circuit illustrated in FIG. 1 to the N-phase interleave boost PFC circuit. That is, the two-phase interleave boost PFC circuit of FIG. 1 is only an example for describing the present invention, and therefore, the present invention can be extended from the two-phase interleave boost PFC circuit to the three, four, five-phase interleave boost PFC circuit, and the like. A part of the boost inductors L1, L2, . . . , Ln may be configured of one coupled inductor. That is, at least one boost inductor may be coupled so as to be formed as a small winding and may be designed to reduce a volume of semiconductor including a circuit.

In the N-phase interleave boost PFC circuit, N boost converter circuits 10 and 11 illustrated in FIG. 1 may be connected with each other in parallel. As a result, each boost converter circuit 10, 11, and 18 may share the overall output power. Further, each boost converter circuit 10, 11, and 18 may be operated to have a phase difference of 360°/N from one another and current flowing in the boost inductors are offset with one another, such that the ripple of the input current may be remarkably reduced. It is apparent that the reduction in the EMI filter size and the reduction in the conduction loss of the circuit described with reference to FIG. 1 may be derived from the N-phase interleave boost PFC circuit Hereinafter, another preferred embodiment of the present invention will be described with reference to FIG. 3.

Figure 3:
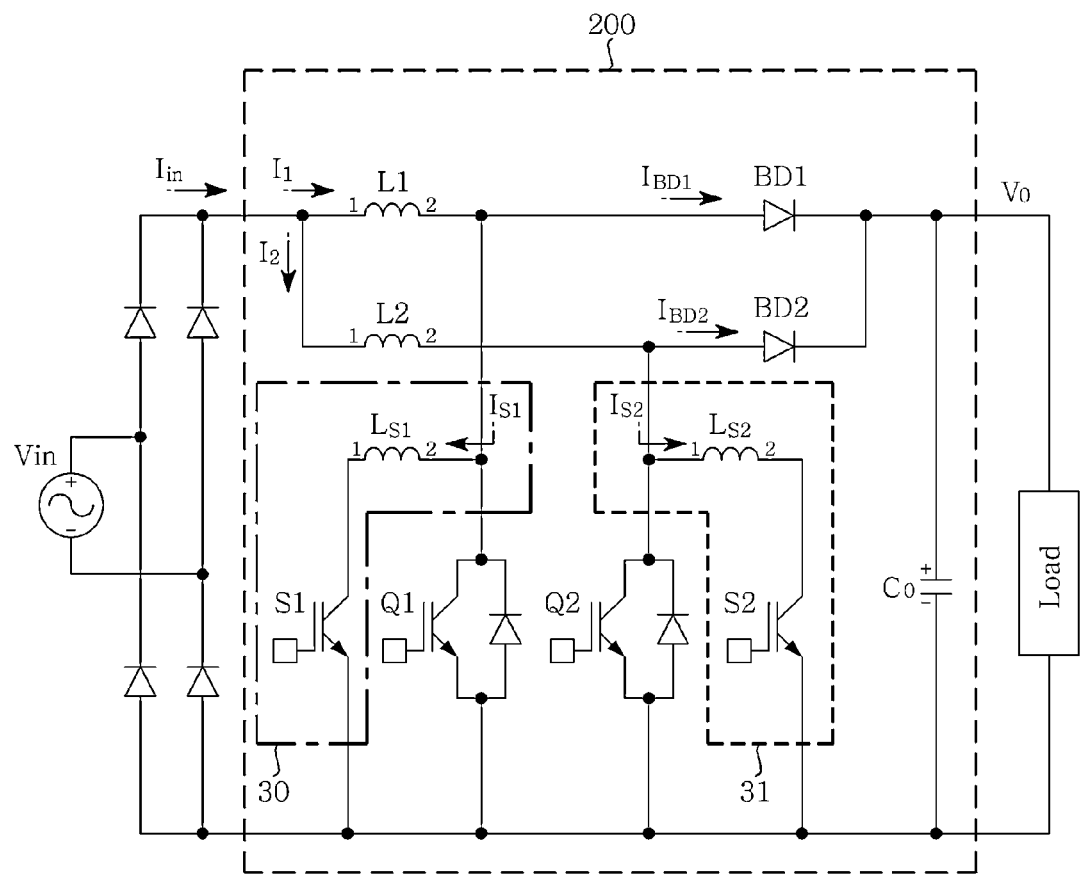
FIG. 3 is a diagram illustrating a two-phase interleave active snubber PFC circuit according to the preferred embodiment of the present invention.

FIG. 3 is a diagram illustrating a two-phase interleave active snubber PFC circuit according to the preferred embodiment of the present invention.

Referring to FIG. 3, a two-phase interleave active snubber PFC circuit 200 has a configuration in which the interleave boost PFC circuit 100 illustrated in FIG. 1 is connected with two snubber circuits 30 and 31. The details of the interleave boost PFC circuit 100 can be appreciated with reference to FIGS. 1 and 2 and therefore, the description thereof will be omitted. The snubber circuit 30 includes a snubber inductor $L_{s1}$ and a snubber switch S1 that may be connected with each other in series. Similarly, the snubber circuit 31 includes a snubber inductor $L_{s2}$ and a snubber switch S2.

The snubber circuits 30 and 31 each include the snubber switch S1 and S2 and may be operated to perform the switching according to the control signal. For this purpose, the snubber switches S1 and S2 may be configured of transistors and control the transistors to perform the switching. The snubber switch is controlled by being configured of a semiconductor device, which is referred to an 'active snubber circuit'. Further, the snubber switches S1 and S2 may be configured of any one of a power MOSFET and an IGBT, in addition to the foregoing transistor.

The snubber circuits 30 and 31 may be connected with the boost switches Q1 and Q2, respectively. The snubber circuits 30 and 31 may be controlled to be conducted for a short period of time immediately before the boost switches Q1 and Q2 are turned on. That is, the snubber switches S1 and S2 are turned on immediately before the boost switches Q1 and Q2 are turned on to conduct the snubber circuits 30 and 31 for a short period of time and conduct the snubber circuits 30 and 31 and the boost switches Q1 and Q2 together, such that the boost switches Q1 and Q2 may be controlled to meet a zero voltage switching turn on condition.

The snubber circuits 30 and 31 are controlled to create the foregoing soft turn on switching condition of the boost switches Q1 and Q2 and meet the zero voltage condition, such that the turn on switching loss of the boost switches Q1 and Q2 may be minimized.

Further, the snubber circuits 30 and 31 are connected with a circuit for a short period of time only before the boost switches Q1 and Q2 are turned on, thereby minimizing the turn on switching loss of the boost switches Q1 and Q2 and minimizing the loss of the snubber circuits 30 and 31.

As described above, in order to meet the turn on switching condition and the zero voltage condition, the boost switches Q1 and Q2 and the snubber switches S1 and S2 may be configured of any one of the transistor, the power MOSFET, and the IGBT.

Figure 4:
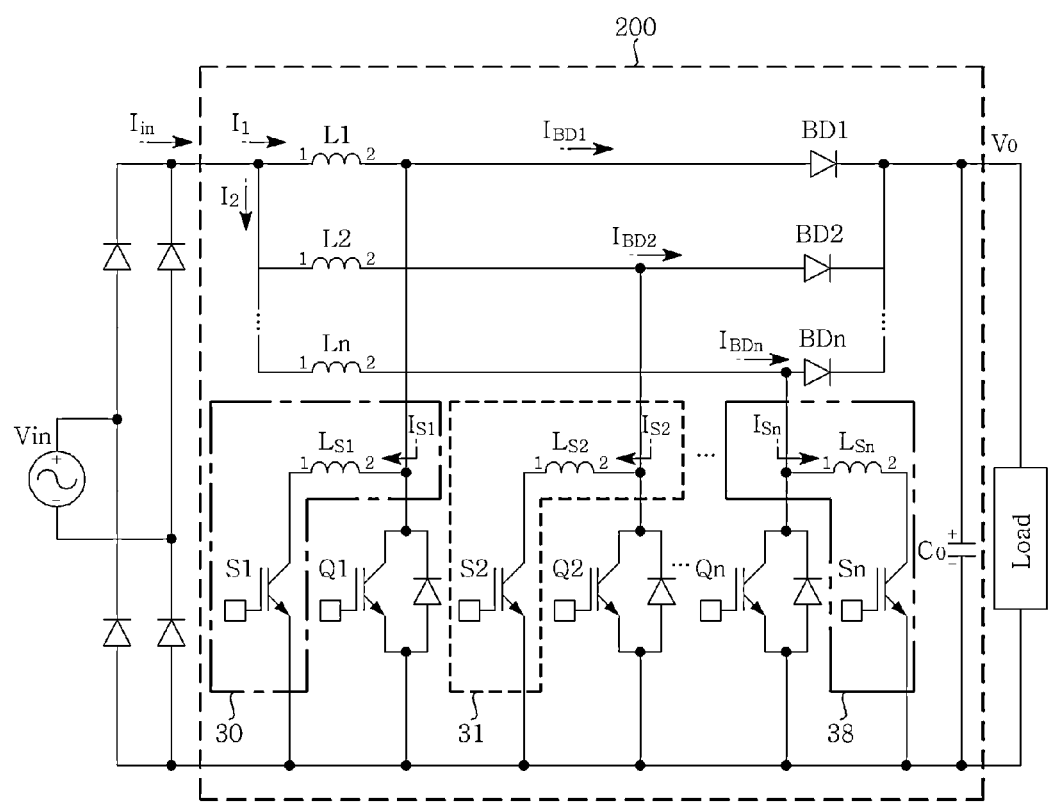
FIG. 4 is a diagram illustrating an N-phase interleave active snubber PFC circuit according to the preferred embodiment of the present invention.

FIG. 4 is a diagram illustrating an N-phase interleave active snubber PFC circuit according to the preferred embodiment of the present invention.

It can be appreciated that the present invention may be extended from the two-phase interleave active snubber PFC circuit of FIG. 3 to the N-phase interleave active snubber PFC circuit. Referring to FIG. 4, the interleave active snubber PFC circuit 200 includes N snubber circuits 30, 31, and 38. As illustrated in FIG. 2, the N boost inductors L1, L2, . . . , Ln may be implemented to have a phase difference of 360°/N from one another and thus, the N snubber inductors $L_{s1}$, $L_{s2}$, . . . , $L_{sn}$ have a phase difference of 360°/N from one another.

The snubber circuits 30, 31, and 38 may be designed to be connected with the boost switches Q1, Q2, . . . , Qn, respectively and the snubber switches S1, S2, . . . , Sn may be controlled to be turned on for a short period of time before the boost switches Q1, Q2, . . . , Qn are turned on. For this purpose, the snubber switches S1, S2, . . . , Sn may be configured of any one of the transistor, the power MOSFET, and the IGBT.

Meanwhile, the snubber inductors $L_{s1}$, $L_{s2}$, . . . , $L_{sn}$ have a very small inductance value and a part or all thereof may be coupled to be formed as a small winding having an air-core form. Further, a part or all of the snubber inductors may be coupled with the boost inductor and may be designed in various types so as to minimize the chip size.

As described above, in the N-phase interleave active snubber PFC circuits, each boost circuit is connected with each other in parallel and has a phase difference of 360°/N to offset current with each other, such that the ripple of the input current may be remarkably reduced, thereby deriving the reduction in the EMI filter size and the reduction in the conduction loss of the circuit.

Further, the snubber circuits 30, 31, and 38 are controlled to meet the soft turn on switching condition/zero voltage condition of each of the boost switches Q1, Q2, . . . , Qn, thereby remarkable reducing the switching loss of the boost switches Q1, Q2, . . . , Qn.

Hereinafter, another preferred embodiment of the present invention will be described with reference to FIG. 5.

Figure 5:
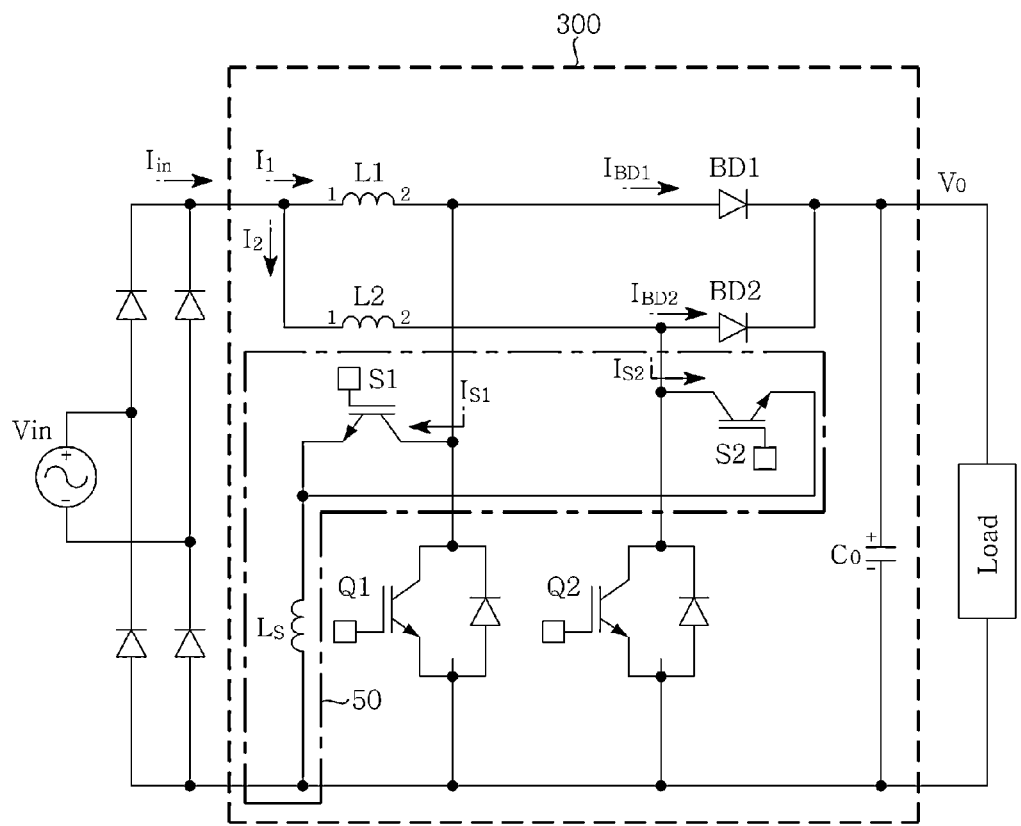
FIG. 5 is a diagram illustrating another two-phase interleave active snubber PFC circuit according to the preferred embodiment of the present invention.

FIG. 5 is a diagram illustrating another two-phase interleave active snubber PFC circuit according to the preferred embodiment of the present invention.

Referring to FIG. 5, a two-phase interleave active snubber PFC circuit 300 has a configuration in which the interleave boost PFC circuit 100 illustrated in FIG. 1 is connected with the snubber circuit 50. The snubber circuit 50 includes the two snubber switches S1 and S2 and one snubber inductor $L_s$.

The snubber switch S1 and the snubber inductor $L_s$ are connected with the boost switch Q1 in parallel, the snubber switch S2 and the snubber inductor $L_s$ are connected with the boost switch Q2 in parallel, and one terminal of the snubber inductor $L_s$ is directly connected with the snubber switches S1 and S2, respectively. That is, the snubber switches S1 and S2 may be designed to share one snubber inductor $L_s$. As described above, the snubber circuit 50 may be configured so that the plurality of snubber switches share one snubber inductor $L_s$. To this end, each snubber switch S1 and S2 may require a floating gate driver.

As illustrate in FIG. 3, the snubber switches S1 and S2 may be turned on before the boost switches Q1 and Q2 are each turned on and may be conducted together with the boost switch for a predetermined period of time. Further, the snubber switches S1 and S2 may be implemented to meet the soft turn on switching condition and the zero voltage condition and may be configured of any one of the transistor, the power MOSFET, and the IGBT.

Figure 6:
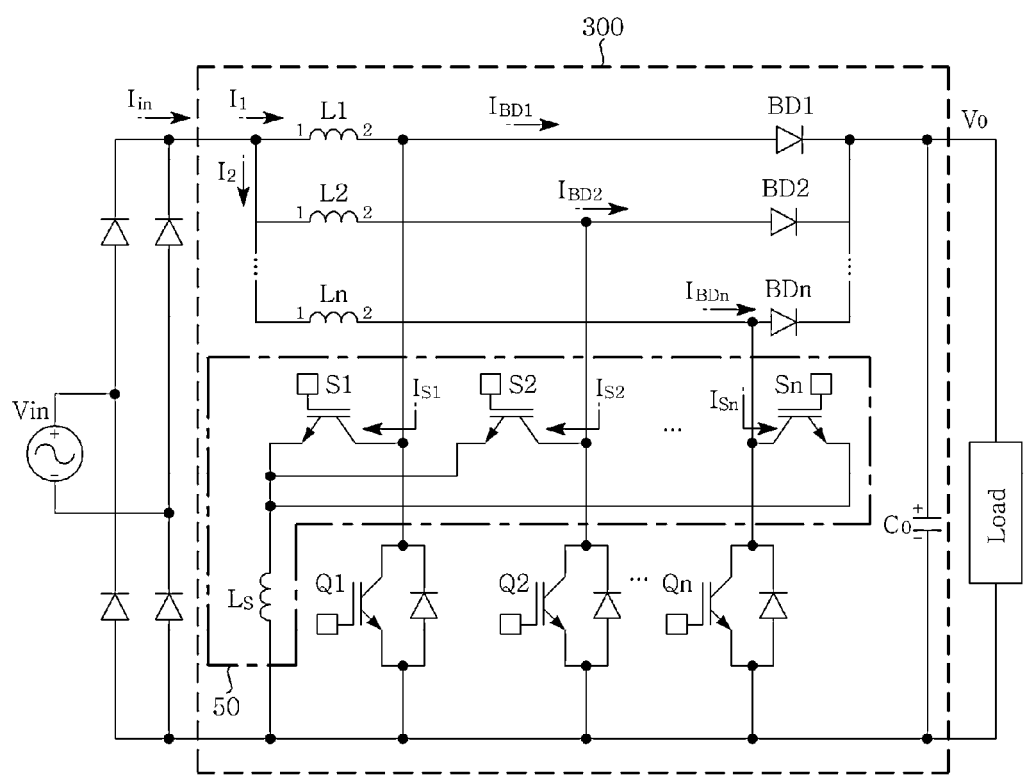
FIG. 6 is a diagram illustrating another N-phase interleave active snubber PFC circuit according to the preferred embodiment of the present invention.

FIG. 6 is a diagram illustrating another N-phase interleave active snubber PFC circuit according to the preferred embodiment of the present invention.

It can be appreciated that the present invention may be extended from the two-phase interleave active snubber PFC circuit of FIG. 5 to the N-phase interleave active snubber PFC circuit. Referring to FIG. 6, the snubber circuit 50 includes N snubber switches S1, S2, . . . , Sn and one snubber inductor $L_s$. The N snubber switches are directly connected with one snubber inductor $L_s$ and share the snubber inductor $L_s$. That is, each of the N snubber switches S1, S2, . . . , Sn are connected with the N boost switches Q1, Q2, . . . , Qn in parallel, together with the snubber inductor $L_s$.

It is illustrated in FIG. 5 that the N snubber switches S1, S2, . . . , Sn are each turned on before the matched boost switches Q1, Q2, . . . , Qn are each turned on and may be implemented so that the boost switches Q1, Q2, . . . , Qn meet the soft turn on condition and the zero voltage condition.

FIG. 6 illustrates that the N snubber switches S1, S2, . . . , Sn share one snubber inductor $L_s$. However, the N snubber switches S1, S2, . . . , Sn may be designed to share the M snubber inductor $L_s$ (N>M). That is, a part of the N snubber switches S1, S2, . . . , Sn may be connected with the first snubber inductor and the other part of the N snubber switches S1, S2, . . . , Sn may be connected with M-th snubber inductor.

The snubber switch sharing the same snubber inductor may also require the floating gate driver.

The snubber switches S1, S2, . . . , Sn are connected with the snubber inductor $L_s$ and may be connected with each of the matched boost switches Q1, Q2, . . . , Qn in parallel. The snubber inductor $L_s$ may be shared with a part of the N snubber switch and may also be connected with only one snubber switch.

A part or all of the M snubber inductor $L_s$ may be coupled with each other so as to be formed as a small winding having the air-core form and may be designed so as to be coupled with the N boost inductors.

As described above, in the N-phase interleave active snubber PFC circuit, each boost circuit is connected in parallel and has a phase difference of 360°/N to offset current with each other, thereby reducing the ripple of the input current and the snubber circuits 30, 31, and 38 are controlled to meet the soft turn on switching condition/zero voltage condition of each of the boost switches Q1, Q2, . . . , Qn, thereby remarkably reducing the switching loss of the boost switches Q1, Q2, . . . , Qn.

Figure 7:
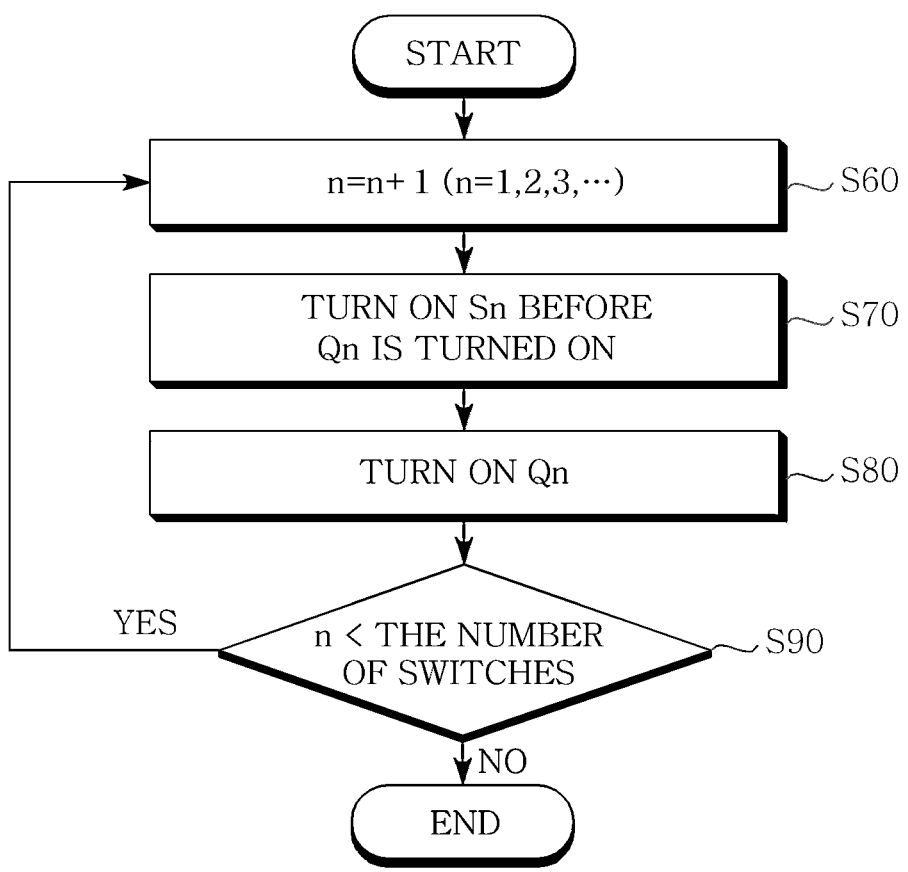
FIG. 7 is a flow chart for describing a method for controlling power factor correction according to the preferred embodiment of the present invention.

Hereinafter, for describing the present invention, the power factor correction method will be described with reference to FIG. 7.

It is preferable to control an interleave active snubber PFC converter circuit including N boost converter circuits having a phase difference of 360°/N and the N snubber circuits. Each boost converter circuit and the snubber circuit have a phase difference and therefore, are sequentially controlled at a time difference (S60). The first snubber switch S1 is turned on before the first boost switch Q1 is turned on (S70). The first boost switch Q1 is turned on after the snubber switch Si is turned on (S80).

The first snubber switch S1 and the first boost switch Q1 may be controlled at the very short time when the first snubber switch S1 and the first boost switch Q1 are in a turn on state. In this case, the power circuit is connected with the snubber switch for a very short instant, such that the loss due to the snubber circuit may be minimized and the zero voltage switching may be substantially performed. As such, in order to implement the zero voltage switching, the snubber switch and the boost switch may be configured of any one of the transistor, the power MOSFET, and the IGBT.

After the boost switch Q1 is soft switched by the first snubber switch S1, it is determined that the switch of the next phase is smaller than the total number N of switching (S90) and if it is determined that the total number N of switching is small, the boost converter circuit and the snubber circuit of the next phase are conducted. When all the switches are switched, ending is performed.

Figure 8:
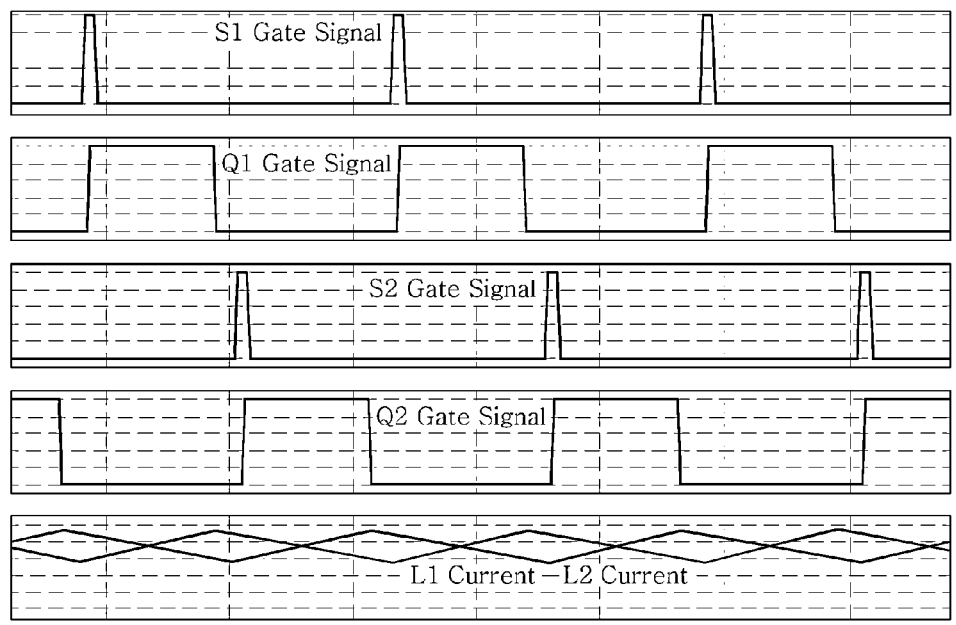
FIG. 8 is a graph illustrating a switching signal and a current waveform of a two-phase interleave active snubber PFC circuit according to the preferred embodiment of the present invention.

FIG. 8 is a graph illustrating a switching signal and a current waveform of a two-phase interleave active snubber PFC circuit according to the preferred embodiment of the present invention.

Referring to FIG. 8, the boost switches Q1 and Q2 are periodically turned on at a time difference. It can be confirmed that the snubber switches S1 and S2 are turned on only at an instant that the boost switches Q1 and Q2 are turned on. When the boost inductors L1 and L2 have a phase difference of 180° from each other and the boost switch Q1 is turned on, the current flowing in the boost inductor L1 is increased and when the boost switch Q2 is turned on, the current flowing in the boost inductor L2 is increased. This process is periodically repeated. FIG. 8 illustrates only the two-phase circuit only by way of example for the purpose of description, but it is already described that the N-phase circuit may be applied according to the power factor control method of FIG. 7.

Figure 9:
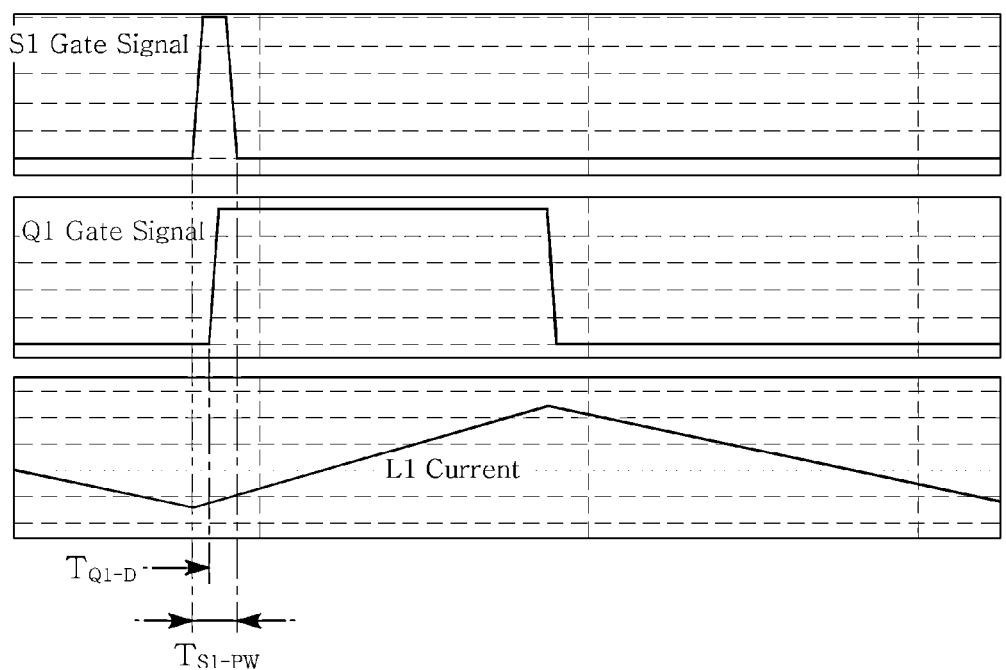
FIG. 9 is an enlarged graph of the switching signal and the current waveform of FIG. 8.

FIG. 9 is an enlarged graph illustrating the switching signal and the current waveform of FIG. 8.

Referring to FIG. 9, the snubber switch S1 is turned on before the boost switch Q1 is turned on and the boost switch Q1 is turned on after a predetermined delay time $T_{Q1-D}$ lapses. Further, when the snubber switch S1 is turned on, the snubber switch S1 may control the boost switch Q1 to generate the zero voltage turn on condition, such that the turn on switching loss of the boost switch Q1 may be minimized.

When the boost switch Q1 is turned on, the snubber switch S1 is in a turn on state for only a short time $T_{S1-PW}$ along with the boost switch and is then turned off. The short time $T_{S1}$ when the snubber switch S1 is turned on may be determined in various manners in consideration of the switch operation characteristics, the gate voltage level, the snubber inductance, the input and output current, and the like, but the present invention is not limited to the specific manner and therefore, all the various manners for determining the time when the snubber switch S1 is turned on are included in the scope of the present invention.

Figure 10:
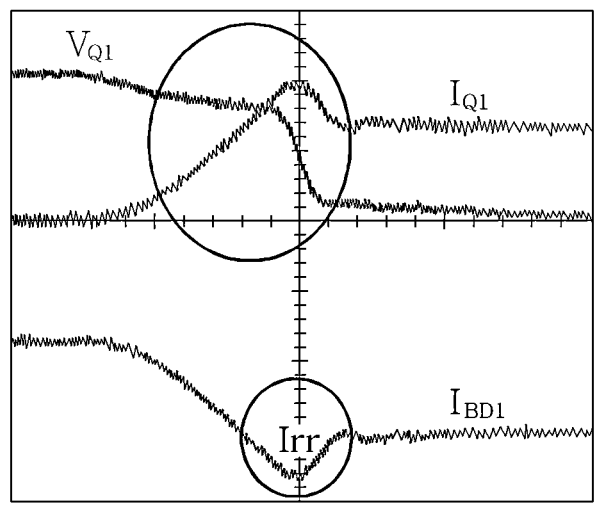
FIG. 10 is a graph comparing performance between the PFC circuit according to the prior art and the interleave active snubber PFC circuit according to the preferred embodiment of the present invention.
Figure 10:
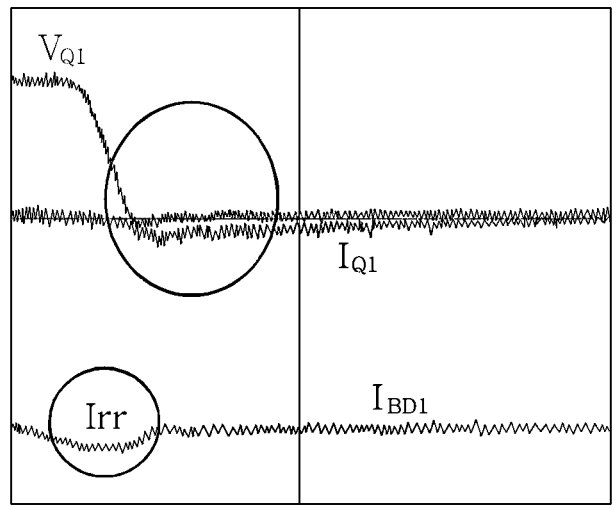

FIG. 10 is a graph comparing performance between the PFC circuit according to the prior art and the interleave active snubber PFC circuit according to the preferred embodiment of the present invention.

The PFC circuit according to the prior art increases the switching loss when the boost switch Q1 is turned on such that the current $I_{Q1}$ may be suddenly increased and reduced before and after the boost switch Q1 is switched. Therefore, the boost diode BD1 generates very large reverse recovery current $I_{rr}$ so as to prevent the current $I_{Q1}$ from suddenly increase and reduce.

On the other hand, the PFC circuit according to the preferred embodiment of the present invention substantially removes the switching loss of the boost switch Q1 based on the zero voltage switching condition such that there is little change in the current $I_{Q1}$. As a result, the reverse recovery current $I_{rr}$ of the boost diode BD1 is little generated. Therefore, it can be appreciated that the reverse recovery current $I_{rr}$ may remarkably reduce the turn on loss of the boost switch Q1 and the EMI noise level.

FIG. 11 is a table comparing effects between the circuit PFC according to the prior art and the interleave active snubber PFC circuit according to the preferred embodiment of the present invention.

Referring to Table 500, as compared with the PFC circuit according to the prior art, the interleave active snubber PFC circuit according to the preferred embodiment of the present invention reduces the boost switch loss and little generates the reverse recovery current of the boost diode to reduce the EMI noise level and increase the efficiency. The added snubber inductor is formed as a small winding having the air-core form or is designed to be coupled with the boost inductor, and the like, such that the chip size may be substantially the same and the efficiency may be maximized. Further, as the switching loss is reduced, the switching frequency of the power supply apparatus may be increased, such that the size of the AC-DC power supply apparatus may be reduced.

According to the preferred embodiment of the present invention, it is possible to remarkably reduce the ripple of the input current and the output voltage, the EMI noise, and the size of the EMI filter, as compared with the existing PFC circuit.

Further, according to the preferred embodiment of the present invention, it is possible to interleave the snubber circuit to minimize the loss occurring at the time of the turn on of the switching of the PFC circuit, thereby increasing the efficiency of the power supply apparatus and to reduce the switching loss to increase the switching frequency of the power supply apparatus, thereby remarkably reducing the size of the AC-DC power supply apparatus.

Although the preferred embodiments of the present invention have been disclosed for illustrative purposes, they are for specifically explaining the present invention. Therefore, those skilled in the art will appreciate that various modifications and alteration are possible, without departing from the scope and spirit of the invention as disclosed in the accompanying claims.

Accordingly, such modifications and alterations should also be understood to fall within the scope of the present invention. A specific protective scope of the present invention could be defined by accompanying claims.

What is claimed is:

1. A power factor correction circuit, comprising:
   a boost converter circuit in which N boost circuits including a boost inductor, a rectifying diode, and a boost switch are connected with each other; and
   a snubber circuit including N snubber switches and M snubber inductors so as to snubber the boost converter circuit,
   wherein N and M meet N>M, and at least two of the N snubber switches are directly connected with one snubber inductor to share a snubber inductor.

2. The power factor correction circuit as set forth in claim 1, wherein N boost inductors each have a phase difference of 360° /N.

3. The power factor correction circuit as set forth in claim 1, wherein the boost inductor has one terminal receiving current and the other terminal connected to the rectifying diode and the boost switch.

4. The power factor correction circuit as set forth in claim 1, wherein the snubber circuit is configured by connecting a set in which one snubber switch is connected with the shared snubber inductor with the boost switch in parallel.

5. The power factor correction circuit as set forth in claim 1, wherein at least one of the M snubber inductors is coupled with the boost inductor.

6. A power factor correction method, comprising:
   performing a control to turn on a first snubber switch before a first boost switch driving a first boost inductor having a first phase is turned on; and
   performing a control to turn on a second snubber switch before a second boost switch driving a second boost inductor having a second phase is turned on,
   wherein the first snubber switch and the second snubber switch are directly connected with one snubber inductor to share a snubber inductor.

7. The power factor correction circuit method as set forth in claim 6, further comprising:
   performing a control to turn on an N-th snubber switch before an N-th boost switch driving an N-th boost inductor having an N-th phase is turned on, wherein N is a natural number of 3 or more.

8. The power factor correction method as set forth in claim 6, wherein the first phase and the second phase have a predetermined phase difference.

9. The power factor correction method as set forth in claim 6, further comprising:
   when the boost switch is turned on, controlling the snubber switch to substantially apply zero voltage switching.

10. A non-transitory computer readable medium on which a program enabling a processor to execute a power factor correction method is recorded, wherein the program includes:
    a command executing a control to turn on a first snubber switch before a first boost switch driving a first boost inductor having a first phase is turned on; and
    a command executing a control to turn on a second snubber switch before a second boost switch driving a second boost inductor having a second phase is turned on,
    wherein the first snubber switch and the second snubber switch are directly connected with one snubber inductor to share a snubber inductor.

11. The non-transitory computer readable medium as set forth in claim 10, wherein the program further includes a command executing a control to turn on an N-th snubber switch before an N-th boost switch driving an N-th boost inductor having an N-th phase is turned on, wherein N is a natural number of 3 or more.

12. The non-transitory computer readable medium as set forth in claim 10, wherein the first phase and the second phase have a predetermined phase difference.

13. The non-transitory computer readable medium as set forth in claim 10, wherein when the boost switch is turned on, the program further includes a command controlling the snubber switch to substantially apply zero voltage switching.

14. A semiconductor chip including the power factor correction circuit as set forth in any one of claims 1 to 3, 4 and 5.

* * * * *